(12) United States Patent
Dong et al.

(10) Patent No.: US 8,531,484 B2
(45) Date of Patent: Sep. 10, 2013

(54) METHOD AND DEVICE FOR GENERATING MORPHING ANIMATION

(71) Applicants: Huawei Technologies Co., Ltd., Guangdong (CN); University of Science and Technology of China, Anhui (CN)

(72) Inventors: Lanfang Dong, Hefei (CN); Zeju Xia, Hefei (CN); Yuan Wu, Shenzhen (CN); Jingfan Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/627,700

(22) Filed: Sep. 26, 2012

(65) Prior Publication Data

US 2013/0079911 A1 Mar. 28, 2013

Related U.S. Application Data

(63) Continuation of application No. PCT/CN2011/080199, filed on Sep. 27, 2011.

(51) Int. Cl.
*G09G 5/00* (2006.01)

(52) U.S. Cl.
USPC .......................................... 345/646; 345/589

(58) Field of Classification Search
None
See application file for complete search history.

(56) References Cited

U.S. PATENT DOCUMENTS

| | | |
|---|---|---|
| 2005/0141062 A1 | 6/2005 | Ishikawa |
| 2006/0077206 A1 | 4/2006 | Jaeger |
| 2007/0148546 A1 | 6/2007 | Shimizu et al. |

FOREIGN PATENT DOCUMENTS

| | | |
|---|---|---|
| CN | 1637843 A | 7/2005 |
| CN | 101236598 A | 8/2008 |
| CN | 101242476 A | 8/2008 |
| CN | 101295354 A | 10/2008 |
| CN | 101923726 A | 12/2010 |
| JP | 2007034724 A | 2/2007 |
| JP | 2007200865 A | 8/2007 |
| KR | 20080018407 A | 2/2008 |

OTHER PUBLICATIONS

Songhua Xu, Tao Jin, and Francis Lau. "Automatic generation of music slide show using personal photos.", 2008, IEEE, Tenth IEEE International Symposium on Multimedia.*
Tony Ezzat, and Tomaso Poggio. "Visual speech synthesis by morphing visemes.", 2000, International Journal of Computer Vision 38.1 (2000): 45-57.*

(Continued)

*Primary Examiner* — Ulka Chauhan
*Assistant Examiner* — Robert Bader

(57) ABSTRACT

Embodiments of the present invention provide a method and a device for generating a morphing animation from multiple images, where the method includes: performing hue preprocessing on adjacent images among multiple images; determining the quantity of intermediate frames between the adjacent images according to a feature point differential of the adjacent images on which the hue preprocessing has been performed, generating, between the adjacent images through an image warping technology, intermediate frame images, the quantity of which is the same as that of the intermediate frames, insert the intermediate frame images between the adjacent images, and generate a morphing animation from the multiple images and the intermediate frame images that are inserted between all adjacent images among the multiple images. The morphing animation generated in the present invention is smooth and natural, thereby improving a morphing effect of the morphing animation.

30 Claims, 5 Drawing Sheets

(56) References Cited

OTHER PUBLICATIONS

Nikhil Sawant, and Niloy J. Mitra. "Color harmonization for videos.", 2008, Proc. of 6th Indian Conf. on Computer Vision, Graphics & Image Processing.*

Cai, Rui, et al. "Automated music video generation using web image resource.", 2007, Acoustics, Speech and Signal Processing, IEEE International Conference on. vol. 2. IEEE.*

Lei Zhang, Mingjing Li, and Hong-Jiang Zhang. "Boosting image orientation detection with indoor vs. outdoor classification." Applications of Computer Vision, 2002.(WACV 2002). Proceedings. Sixth IEEE Workshop on. IEEE, 2002.*

Yi Wu, and David Suter. "Historical film processing." SPIE's 1995 International Symposium on Optical Science, Engineering, and Instrumentation. International Society for Optics and Photonics, 1995.*

Kwok-Wai Wan, Kin-Man Lam, and Kit-Chong Ng. "An accurate active shape model for facial feature extraction." Pattern Recognition Letters 26.15 (2005): 2409-2423.*

Karungaru et al., "Morphing Human Faces: Automatic Control Points Selection and Color Transition," Proceedings of World Academy of Science, Engineering and Technology, vol. 1, Jan. 2005, total 4 pages.

Karungaru et al., "Automatic Human Faces Morphing Using Genetic Algorithms Based Control Points Selection," International Journal of Innovative Computing, Information and Control, vol. 3, No. 2, Apr. 2007, total 10 pages.

Zanella et al., "An Approach to Automatic Morphing of Face Images in Frontal View," 2004, total 10 pages.

Wang et al., "Image Morphing Algorithm Based on Biharmonic Spline Interpolation and Its Implementation," Journal of Image and Graphics, vol. 12, No. 12, Dec. 2007, total 7 pages.

Search report and Written Opinion issued in corresponding PCT application No. PCT/CN2011/080199, dated Jun. 28, 2012, total 17 pages.

Yi Zhang, "Generation of Expressive Facial Animation Based on Visual Feature Extraction," dated Aug. 15, 2005, total 9 pages.

Xia Zeju:"Study on the Morphing of Color Facial Images Based on Improved MR-ASM", dated Jan. 15, 2011, total 47 pages.

1st office action issued in corresponding Chinese patent application 201180002501.8, dated Oct. 29, 2012,and English translation thereof, total 14 pages.

Xia Ze- ju et al. "Automatic Morphing Realization of Color Face Images", Dec. 2010, total 3 pages.

* cited by examiner

METHOD AND DEVICE FOR GENERATING MORPHING ANIMATION

CROSS-REFERENCE TO RELATED APPLICATIONS

This application is a continuation of International Application No. PCT/CN2011/080199, filed on Sep. 27, 2011, which is hereby incorporated by reference in its entirety.

FIELD OF THE INVENTION

The present invention relates to an image processing technology, and in particular, to a method and a device for generating a morphing animation.

BACKGROUND OF THE INVENTION

A method and a device for generating a morphing animation from multiple images have been widely applied currently. A general method for a morphing animation is that, on the basis of achieving image warp, first two images are warped in two directions respectively. The two images are referred to as a source image and a destination image respectively according to a playing time sequence, and warp in two directions includes two kinds of warp: warp from a source image to a destination image and warp from a destination image to a source image. Image gray scale fusion is performed on the two warped images to generate a series of intermediate images, thereby achieving smooth morphing of the images. Therefore, the quality and relevant features of an image warping technology are key factors that affect image morphing.

Currently, the image warping technology has already been widely applied in visual effects and advertising design. After extensive and thorough research on the image warping technology, a series of methods that focus spatial mapping are formed. In image warping, spatial mapping is the core, and according to this, the image warping technology may be generally categorized into three types:

(1) Block-based image warping. A typical algorithm includes a 2-step mesh image warping algorithm and a triangulation-based warping algorithm. Their common concept is to divide a whole image into several blocks and then combine warp of every small block to achieve warp of the whole image. An distinctive advantage of this type of algorithms is that warping speed is high. However, preprocessing work of dividing the image into small blocks is troublesome, and the reasonably and effectiveness of block division directly affect a final warping effect.

(2) Line-based warping. A concept of this algorithm is to build a series of feature lines on an image, and an offset of each pixel on the image is determined jointly by distances between the pixel and these feature lines. This method still has a problem that warping speed is low, and is not intuitive enough.

(3) Point-based warping. A typical algorithm is a warping algorithm based on a radial basis function. A basic concept of this algorithm is to regard an image as a formation of multiple scattered points. A spatial mapping of all points on the image is achieved through a spatial mapping of some designated special points and a certain proper radial basis function. Such an algorithm is relatively intuitive. However, because the radial basis function is usually a complicated function such as a Gaussian function, warping speed is quite low. In addition, such an algorithm can hardly ensure a stable border of a warped image.

People have a higher and higher demand for an animation morphing effect, but with a current image warping technology, achieved morphing quality of a morphing animation generated from multiple images is not easily controllable and needs to be further improved.

SUMMARY OF THE INVENTION

Embodiments of the present invention provide a method and a device for generating a morphing animation from multiple images, so as to improve a morphing visual effect.

An embodiment of the present invention provides a method for generating a morphing animation, where the method includes: performing hue preprocessing on adjacent images among multiple images to reduce a hue difference between the adjacent images; and determining the quantity of intermediate frames between the adjacent images according to a feature point differential of the adjacent images on which the hue preprocessing has been performed, where the feature point differential is obtained through calculation according to a pixel distance of feature points that correspond to the adjacent images, generating, between the adjacent images through an image warping technology, intermediate frame images, the quantity of which is the same as that of the intermediate frames, inserting the intermediate frame images between the adjacent images, and generating a morphing animation from the multiple images and the intermediate frame images that are inserted between all adjacent images among the multiple images.

An embodiment of the present invention provides a device for generating a morphing animation, where the device includes: a hue preprocessing module, configured to perform hue preprocessing on adjacent images among multiple images to reduce a hue difference between the adjacent images; an intermediate frame generating module, configured to determine the quantity of intermediate frames according to a feature point differential of the adjacent images on which the hue preprocessing has been performed by the hue preprocessing module, where the feature point differential is obtained through calculation according to a pixel distance of feature points that correspond to the adjacent images, generate, between the adjacent images through an image warping technology, intermediate frame images, the quality of which is the same as that of the intermediate frames and insert the intermediate frame images between the adjacent images; and an animation generating module, configured to generate a morphing animation from the multiple images and the intermediate frame images that are inserted between all adjacent images among the multiple images.

An embodiment of the present invention provides a method for generating a music playback background, where the method includes: receiving multiple images used for generating an animation; performing hue preprocessing on adjacent images among the multiple images to reduce a hue difference between the adjacent images; determining the quantity of intermediate frames according to a feature point differential of the adjacent images on which the hue preprocessing has been performed, generating, between the adjacent images through an image warping technology, intermediate frame images, the quantity of which is the same as that of the intermediate frames, inserting the intermediate frame images between the adjacent images, generating a morphing animation from the multiple images and the intermediate frame images that are inserted between all adjacent images among the multiple images; and using the morphing animation as a playback background for a music player.

An embodiment of the present invention provides a music player, including: a hue preprocessing module, configured to perform hue preprocessing on adjacent images among multiple images to reduce a hue difference between the adjacent images; an intermediate frame generating module, configured to determine the quantity of intermediate frames according to a feature point differential of the adjacent images on which the processing has been performed by the hue preprocessing module, where the feature point differential is obtained through calculation according to a pixel distance of feature points that correspond to the adjacent images, generate, between the adjacent images through an image warping technology, intermediate frame images, the quantity of which is the same as that of the intermediate frames, and insert the intermediate frame images between the adjacent images; an animation generating module, generate a morphing animation according to the multiple images and the intermediate frame images that are inserted between all adjacent images among the multiple images; and a playback module, configured to play a music file, and when remaining playback time of the music file is greater than zero, play the morphing animation on a video display interface of the music file.

In the embodiments of the present invention, hue preprocessing is performed and intermediate frame images, the quantity of which is the same as that of the intermediate frames, are inserted between adjacent images to generate a morphing animation, where the quantity of the intermediate frames is determined according to a feature point differential, and a generated morphing animation is smooth and natural, thereby improving a morphing effect of the morphing animation.

BRIEF DESCRIPTION OF THE DRAWINGS

To illustrate the technical solutions in the embodiments of the present invention or in the prior art more clearly, the accompanying drawings required for describing the embodiments or the prior art are introduced briefly in the following. Apparently, the accompanying drawings in the following description are merely some embodiments of the present invention, and persons of ordinary skill in the art may also derive other drawings from these accompanying drawings without creative efforts.

DETAILED DESCRIPTION OF THE EMBODIMENTS

To make the objectives, technical solutions, and advantages of the present invention clearer, the technical solutions in the embodiments of the present invention are clearly and completely described in the following with reference to the accompanying drawings in the embodiments of the present invention. Apparently, the embodiments in the following description are merely a part rather than all of the embodiments of the present invention. Based on the embodiments of the present invention, all other embodiments obtained by persons of ordinary skill in the art without creative effects shall fall within the protection scope of the present invention.

Figure 1:
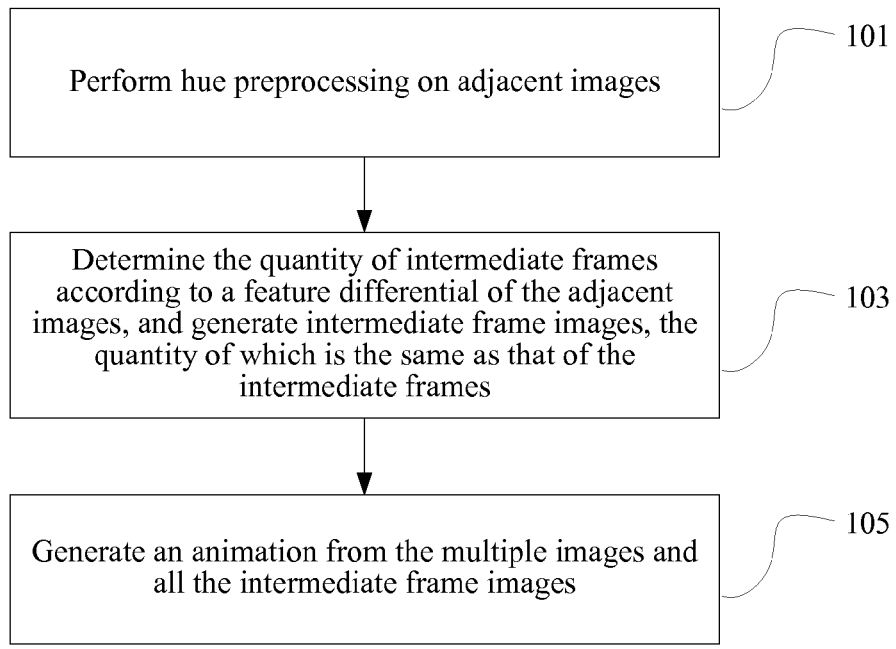
FIG. 1 is a flow chart of a method for generating a morphing animation according to an embodiment of the present invention.

An embodiment of the present invention provides a method for generating a morphing animation from multiple images, where the method includes: performing hue preprocessing on adjacent images among the multiple images to reduce a hue difference between the adjacent images; and determining the quantity of intermediate frames between the adjacent images according to a feature point differential of the adjacent images on which the hue preprocessing has been performed, where the feature point differential is obtained through calculation according to a pixel distance of feature points that correspond to the adjacent images, generating, between the adjacent images through an image warping technology, intermediate frame images, the quantity of which is the same as that of the intermediate frames, inserting the intermediate frame images between the adjacent images, and generating a morphing animation from the multiple images and the intermediate frame images that are inserted between all adjacent images among the multiple images. Referring to FIG. 1, FIG. 1 is a flow chart of a method for generating a morphing animation from multiple images according to an embodiment of the present invention, which includes:

S101: Perform hue preprocessing on adjacent images among multiple images to reduce a hue difference between the adjacent images, so that a generated animation is played more smoothly from one to the other of the adjacent images.

S103: Determine the quantity of intermediate frames according to a feature point differential of the adjacent images on which the hue preprocessing has been performed, and generate, between the adjacent images through an image warping technology, intermediate frame images, the quantity of which is the same as that of the intermediate frames.

S105: Generate a morphing animation from the multiple images and the intermediate frame images that are inserted between all two adjacent images among the multiple images.

In an implementation manner of the present invention, the image is a human face image. The performing hue preprocessing on adjacent images among the multiple images includes: performing hue preprocessing on adjacent images among multiple human face images.

In another implementation manner of the present invention, before the performing hue preprocessing on adjacent images among the multiple human face images in S101, the method further includes: sorting the multiple human face images to generally reduce a difference between adjacent images. The performing hue preprocessing on adjacent images among the multiple images refers to: performing hue preprocessing on adjacent images among sorted multiple human face images.

Figure 2:
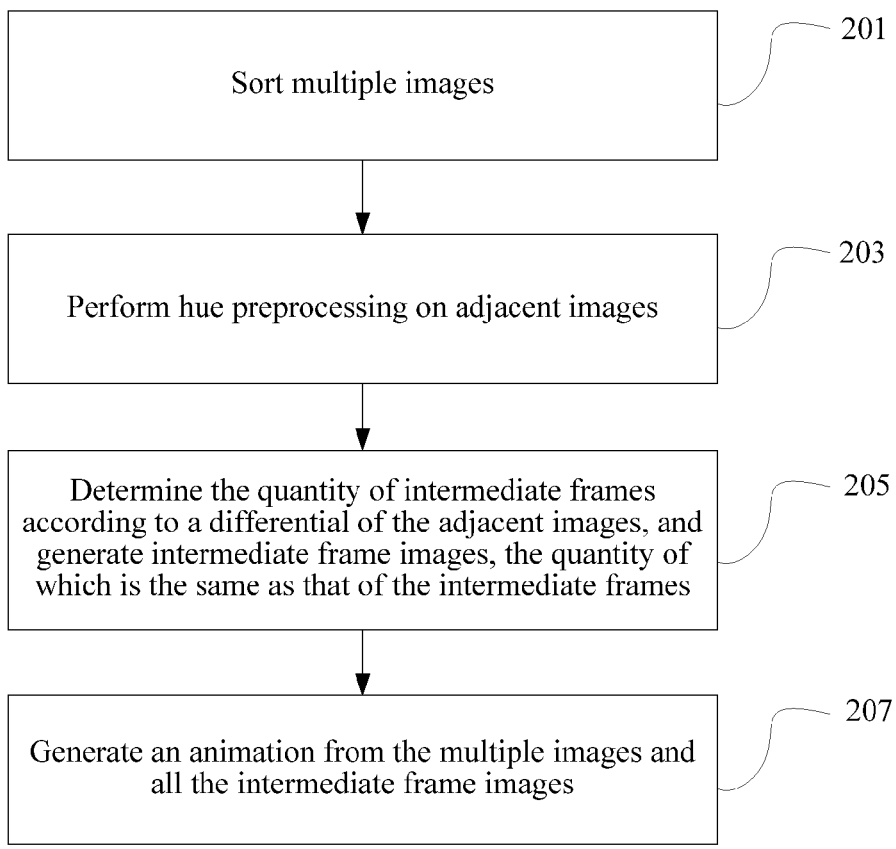
FIG. 2 is a schematic diagram of a method for generating a morphing animation according to another embodiment of the present invention.

A flow chart of an embodiment of the present invention is shown in FIG. 2, and the method includes:

S201: Sort the multiple human face images to generally reduce a difference between adjacent images, so that a generated animation is smoother and more natural.

S203: Perform image hue preprocessing on adjacent images among the multiple human face images to reduce a hue difference between the adjacent images, so that the generated animation is played more smoothly from one to the other of the adjacent images.

S205: Determine the quantity of intermediate frames according to similarity of the adjacent images, generate, between the adjacent images through an image warping technology, intermediate frame images, the quantity of which is the same as that of the intermediate frames.

S207: Generate a morphing animation from the multiple human face images and the intermediate frame images that are inserted between all two adjacent images of the multiple human face images.

Further, the sorting the multiple human face images in S201 specifically includes: sorting the multiple human face images according to a human face size.

Specific steps are as follows:

After all pictures are read, statistics is performed on sizes of the pictures to find a smallest picture size, or a picture size is specified and all pictures are transformed into pictures of the same picture size.

Statistics is performed on human face sizes in the transformed images with the same picture size, and the multiple images are sorted in ascending or descending order according to human face sizes in the transformed images with the same picture size.

Next processing is performed on a sorted picture sequence.

In a specific embodiment, a human face size may be a human face area, a human face width, a human face length, and so on.

A morphing animation effect of adjacent human face images is affected by a human face size difference in the adjacent images. When the human face size difference is larger, in an equivalent condition, an achieved animation effect is less natural and smooth; and when the human face size difference is smaller, in an equivalent condition, an achieved animation effect is smoother and more natural. Therefore, compared with an animation effect without such a sorting process, an overall morphing effect formed by multiple human face pictures sorted based on human face sizes is better than a morphing effect achieved in an equivalent and subsequent morphing processing method.

The sorting the multiple human face images in S201 further includes: sorting the multiple human face images according to image intensity.

Specific steps are as follows:

Calculate a mean intensity value of all sampling points of an image and use the mean intensity value as an intensity value of the image.

According to the foregoing method, after mean intensity values of multiple human face pictures are calculated respectively, the multiple images are sorted in ascending or descending order of the mean intensity values.

Next processing is then performed on a sorted picture sequence.

A morphing animation effect of adjacent human face images is affected by an intensity difference of the adjacent images. When the intensity difference is larger, in an equivalent condition, an achieved animation effect is less smooth and natural; and when the intensity difference is smaller, in an equivalent condition, an achieved animation effect is smoother and more natural. An animation generated from sorted multiple pictures is smoother in a transition from darkness to brightness or from brightness to darkness in terms of overall intensity, so that a visual effect of a morphing animation of multiple pictures can be generally improved. Compared with an animation effect without such a sorting process, an overall effect of an animation generated from multiple human face pictures sorted based on human face sizes is smoother and more natural than an animation effect achieved in an equivalent and subsequent processing method.

Specifically, the performing image hue preprocessing on the adjacent images among the multiple human face images in S203 specifically includes: performing calculation according to hues of the adjacent images to obtain a hue difference, obtaining a hue difference absolute value according to the hue difference, when the difference absolute value is greater than a first threshold, determining an image whose hue needs to be adjusted in the adjacent images and a hue adjustment manner according to the difference, and then performing, according to the hue adjustment manner, hue adjustment on the image whose hue needs to be adjusted.

The performing calculation according to the hues of the adjacent images to obtain the hue difference of the adjacent images includes: subtracting a mean hue value of a second image from a mean hue value of a first image in the adjacent images to obtain the hue difference of the adjacent images; and the performing, according to the hue adjustment manner, hue adjustment on the image that needs to be adjusted includes: if the hue difference is greater than zero, decreasing a hue of each pixel in the first image or increasing a hue of each pixel in the second image; and if the hue difference is smaller than zero, increasing a hue of each pixel in the first image or decreasing a hue of each pixel in the second image.

Figure 3:
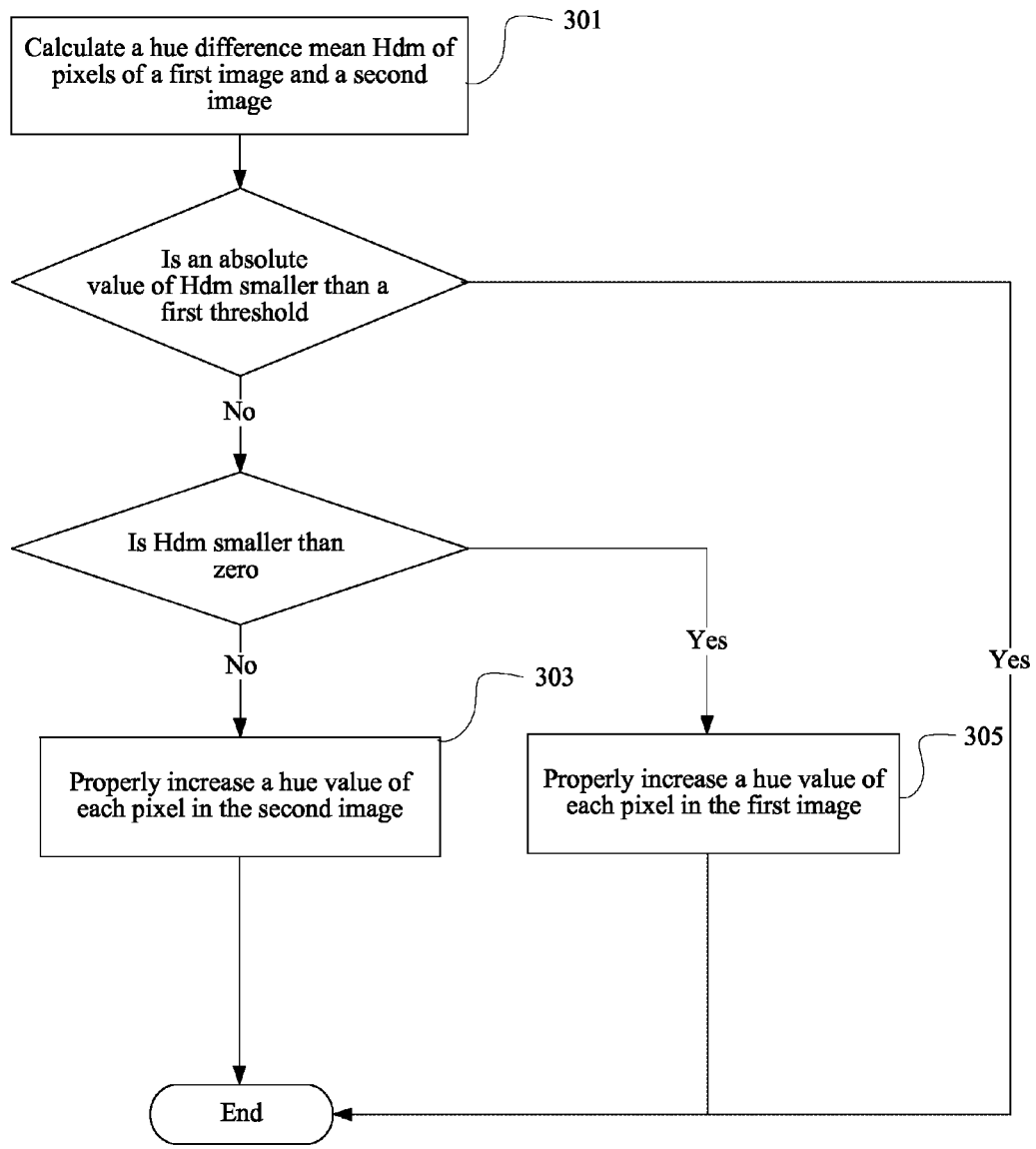
FIG. 3 is a flow chart of preprocessing of hue morphing according to an embodiment of the present invention.

Referring to FIG. 3, FIG. 3 is a flow chart of animation preprocessing of hue morphing according to an embodiment, and a process includes:

S301: Calculate a difference Hdm by subtracting a mean hue value of pixels of a second image from a mean hue value of pixels of a first image in adjacent images.

If an Hdm absolute value is greater than a first threshold, and Hdm is greater than 0:

S303: Properly increase a hue value of each pixel in the second image.

If an Hdm absolute value is greater than a first threshold, and Hdm is smaller than 0:

S305: Properly increase a hue value of each pixel in the first image.

A process of calculating a hue difference between the first image and the second image in the adjacent images in S301 specifically includes:

First, convert a first image S and a second image D into an HIS color model respectively, so as to obtain a hue value of a random pixel in the images.

Next, the second image is scaled to the same scale of the first image, and assume the width and height of the first image to be W and H respectively, where the width and height use the quantity of pixels as a unit.

Subsequently, construct a corresponding rectangular region on the first image and the second image respectively, where the width of a rectangle is w (0<w<=W), the height of the rectangle is h (0<h<=H), and the width and height of the rectangle use the quantity of pixels as a unit.

Afterward, obtain hue values of corresponding pixels in the first image and the second image respectively, and calculate a sum Hdt of hue value differences of corresponding pixels on the first image and the second image, as shown in formula (1):

$$Hdt = \sum_{j=1}^{h}\sum_{i=1}^{w}(Hue(S_{ij}) - Hue(D_{ij})). \tag{1}$$

Finally, divide Hdt by the quantity of all mesh points to obtain a hue difference mean Hdm of image pixels, as shown in formula (2):

$$Hdm = Hdt/(w \times h) \tag{2}.$$

The hue difference mean Hdm of the first image and the second image is used to represent hue similarity of the first image and the second image. In a specific embodiment, the width and height of the rectangle are W and H respectively.

If the current Hdm is a positive value and is greater than a first threshold, it indicates that a mean hue value of pixels in the second image is relatively low, and hue values of all pixels in the second image are properly increased in S303. In a specific embodiment, the first threshold is 0.1, and the hue value of each pixel in the second image is added by 0.8× |Hdm|.

If the current Hdm is a negative value and is greater than a first threshold, it indicates that a mean hue value of pixels in the first image is relatively low, and hue values of all pixels in the first image are properly increased in S305. In a specific embodiment, the hue value of each pixel in the first image is added by 0.8×|Hdm|.

If the current Hdm approximates zero, it indicates that the first image and the second image have a similar hue and hue adjustment is not required.

In an embodiment of the present invention, a method in S203 further includes: performing intensity preprocessing on adjacent images among the multiple images to reduce an intensity difference of the adjacent images; and the determining the quantity of intermediate frames between the adjacent images according to a feature point differential of the adjacent images on which the hue preprocessing has been performed, includes: determining the quantity of intermediate frames between the adjacent images according to a feature point differential of the adjacent images on which the hue preprocessing and intensity preprocessing have been performed.

The intensity preprocessing specifically includes: performing calculation according to intensity of the adjacent images to obtain an intensity difference of the adjacent images, obtaining an intensity difference absolute value through calculation according to the intensity difference, when the difference absolute value is greater than a second threshold, first determining an image whose intensity needs to be adjusted in the adjacent images and an intensity adjustment manner according to the difference, and then performing, according to the intensity adjustment manner, intensity adjustment on the image whose intensity needs to be adjusted.

The performing calculation according to the intensity of the adjacent images to obtain the intensity difference of the adjacent images includes: subtracting a mean intensity value of a second image from a mean intensity value of a first image in the adjacent images to obtain the intensity difference of the adjacent images; and the performing, according to the intensity adjustment manner, intensity adjustment on the image that needs to be adjusted includes: if the intensity difference is greater than zero, decreasing intensity of each pixel in the first image or increasing intensity of each pixel in the second image; and if the intensity difference is smaller than zero, increasing intensity of each pixel in the first image or decreasing intensity of each pixel in the second image.

Figure 4:
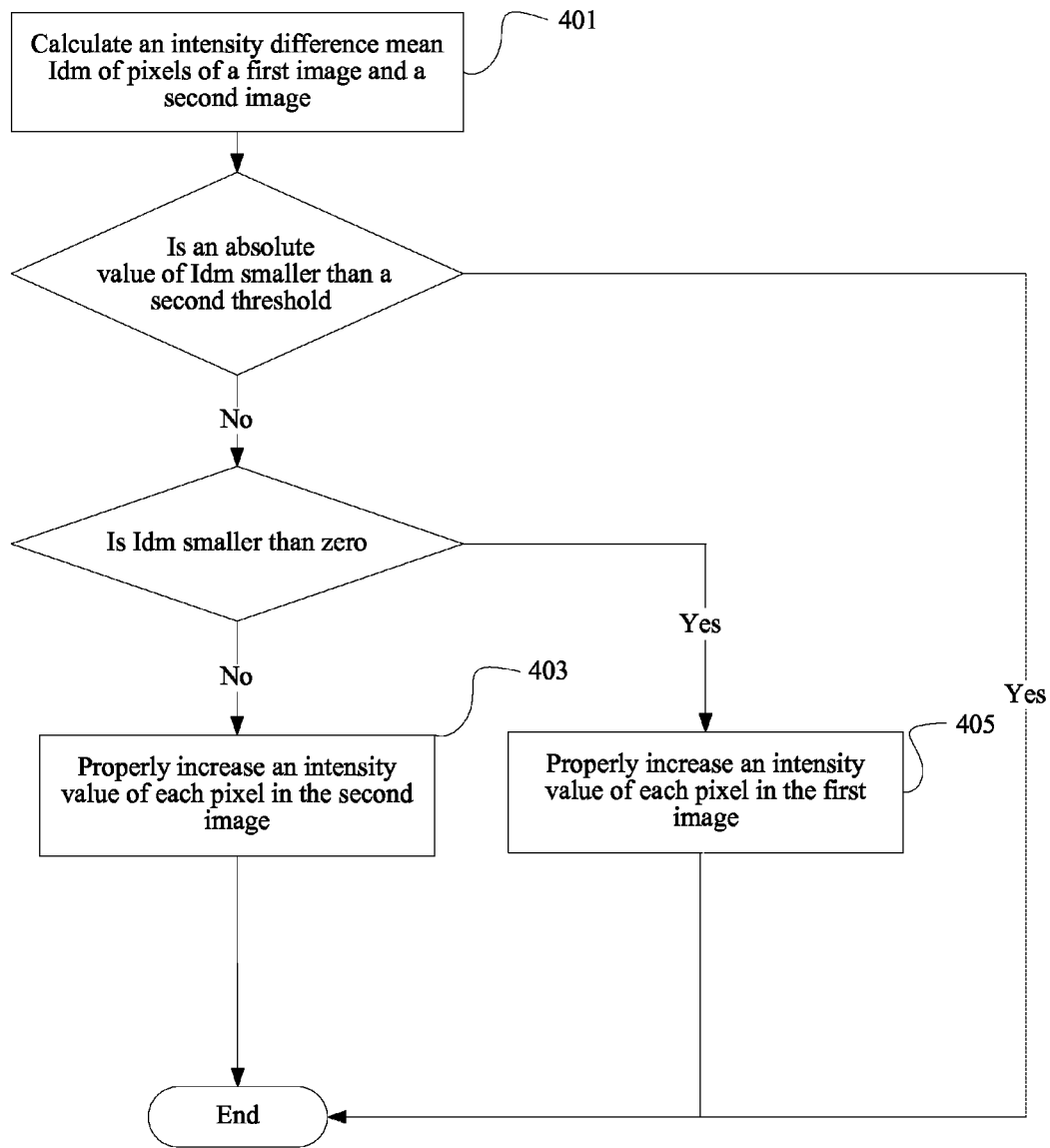
FIG. 4 is a flow chart of preprocessing of intensity morphing according to an embodiment of the present invention.

Referring to FIG. 4, FIG. 4 is a flow chart of animation preprocessing of intensity morphing according to an embodiment of the present invention, and a process includes:

S401: Calculate a difference value Idm by subtracting a mean intensity value of pixels of a second image from a mean intensity value of pixels of a first image in adjacent images.

If an Idm absolute value is greater than a second threshold, and Idm is greater than 0:

S403: Properly increase an intensity value of each pixel in the second image.

If an Idm absolute value is greater than a second threshold, and Idm is smaller than 0:

S405: Properly increase an intensity value of each pixel in the first image.

A process of calculating intensity similarity of the first image and the second image in S401 is as follows:

First, convert a first image S and a second image D into an HIS color model respectively, so as to obtain an intensity value of a random pixel in the images.

Next, the second image is scaled to the same scale of the first image, and herein, assume the width and height of the first image to be W and H respectively, and the width and height both use the quantity of pixels as a unit.

Subsequently, construct a corresponding rectangular region on the first image and the second image respectively, where the width of a rectangle is w (0<w<W), the height of the rectangle is h (0<h<H), and the width and height of the rectangle both use the quantity of pixels as a unit.

Afterward, obtain intensity values of pixels of mesh points on the first image and the second image respectively, and calculate an intensity difference total (Intensity difference total, Idt) of pixels that are on the first image and the second image and correspond to the mesh points, as shown in formula (3):

$$Idt = \sum_{j=1}^{h}\sum_{i=1}^{w}(\text{Intensity}(S_{ij}) - \text{Intensity}(D_{ij})). \quad (3)$$

Then, divide Idt by the quantity of all mesh points to obtain an intensity difference mean Idm (Intensity difference mean) of image pixels, as shown in formula (4):

$$Idm = Idt/(w \times h) \quad (4).$$

The intensity difference mean Idm of the first image and the second image is used to represent intensity similarity of the first image and the second image. In a specific embodiment, the width and height of the rectangle are W and H respectively.

If the current Idm is a positive value and is greater than a second threshold, it indicates that a mean intensity value of pixels in the second image is relatively small, and intensity values of all pixels in the second image are properly increased to obtain higher similarity between the second image and the first image in S403. In a specific embodiment, the first threshold is 0.1, and the intensity value of each pixel in the second image is added by 0.8×|Idm|.

If the current Idm is a negative value and is relatively large, it indicates that a mean intensity value of pixels in the second image is relatively large, and intensity values of all pixels in the first image may be properly increased to obtain higher similarity between the second image and the first image. In a specific embodiment, the first threshold is 0.1, and the intensity value of each pixel in the first image is added by 0.8×|Idm|.

If the current Idm approximates zero, it indicates that the first image and the second image have similar intensity and intensity adjustment is not required.

In the case that a hue difference of adjacent images is large, an achieved morphing animation effect of color images can hardly be ensured. Therefore, in this embodiment of the present invention, hue and intensity differences of adjacent images that need morphing animation processing are first evaluated. When the differences are large, hue preprocessing is performed and then subsequent morphing animation processing is performed. If a result of automatic evaluation is that the differences are small, the subsequent morphing animation processing is directly performed on the group of pictures.

The determining the quantity of intermediate frames according to similarity of the adjacent images in S205 includes: determining the quantity of intermediate frames according to a feature point differential of the adjacent images.

In an embodiment of the present invention, a method for extracting a feature point includes:

training a human face image library through an active shape model (ASM) algorithm first, and obtaining a feature point detection file through an ASM training result;

for an input image that contains a human face, obtaining a human face region in the image by using an Adaboost algorithm, where the Adaboost algorithm is a most commonly used human face detection algorithm currently; and at last, positioning a human face feature point in the human face region by using the feature point detection file that is output by using the ASM training algorithm.

In an embodiment of the present invention, the quantity of human face feature points is selected as 45.

In a specific embodiment of the present invention, a normalization-based absolute distance method is adopted for a feature point differential. Adjacent images are referred to as a source image and a destination image respectively according to a playing time sequence.

The method is as follows:

First, define scaling coefficients xScale and yScale, and calculation methods are as shown in formulas (5) and (6):

$$xScale = Dx/Sx \quad (5),$$

$$yScale = Dy/Sy \quad (6).$$

Assume the width and height of the source image to be Sx and Sy respectively, and the width and height of the destination image to be Dx and Dy respectively.

Map and convert positions of $D_i (1 \leq i \leq N)$ of N feature points in the destination image into positions of $D'_i (1 \leq i \leq N)$ in the scale of the source image, and calculation methods are as shown in formulas (7) and (8):

$$(D'_i)_x = (D_i)_x / xScale \quad (7),$$

$$(D'_i)_y = (D_i)_y / yScale \quad (8).$$

Assuem that $S_i$ is positions of N feature points of the source image, where $1 \leq i \leq N$.

Next, calculate an absolute feature difference Re of the source image and the destination image, which is shown in formula (9):

$$Re = \frac{1}{N} \sum_{i=1}^{N} \|D'_i - S_i\|. \quad (9)$$

At last, calculate a relative feature difference aRe of the source image and the destination image, which is shown in formula (10):

$$aRe = Re/Sf \quad (10).$$

Assume the width of a human face in the source image to be Sf.

In the present invention, the relative feature difference aRe of the source image and the destination image is used to represent a feature differential of the source image and the destination image.

In the case of different human face feature differences of the source image and the destination image, in the morphing animation processing, the quantity of intermediate frames may be selected differently for a source image and a destination image of a morphing animation. Determining the quantity of intermediate frames according to a value of a feature point differential of the adjacent images includes: when the value of the feature point differential of the adjacent images falls in a first interval, determining the quantity of intermediate frames as the first quantity; and when a value of similarity of the adjacent images falls in a second interval, determining the quantity of intermediate frames as the second quantity, where a value of the first interval is smaller than a value of the second interval, and the first quantity is smaller than the second quantity.

In an embodiment of the present invention, adjacent images are referred to as a source image and a destination image respectively according to a playing time sequence. Intuitively evaluating, to achieve a more natural morphing animation, when a value of feature similarity of the source image and the destination image is larger, a relative feature difference is smaller, and a morphing animation process requires fewer intermediate frames; and when the value of the feature similarity of the source image and the destination image is smaller, the relative feature difference is larger, and the morphing process requires more intermediate frames. After evaluation of a specific source image and destination image, the different quantity of intermediate frames need to be selected according to an evaluation result for morphing processing.

Figure 5:
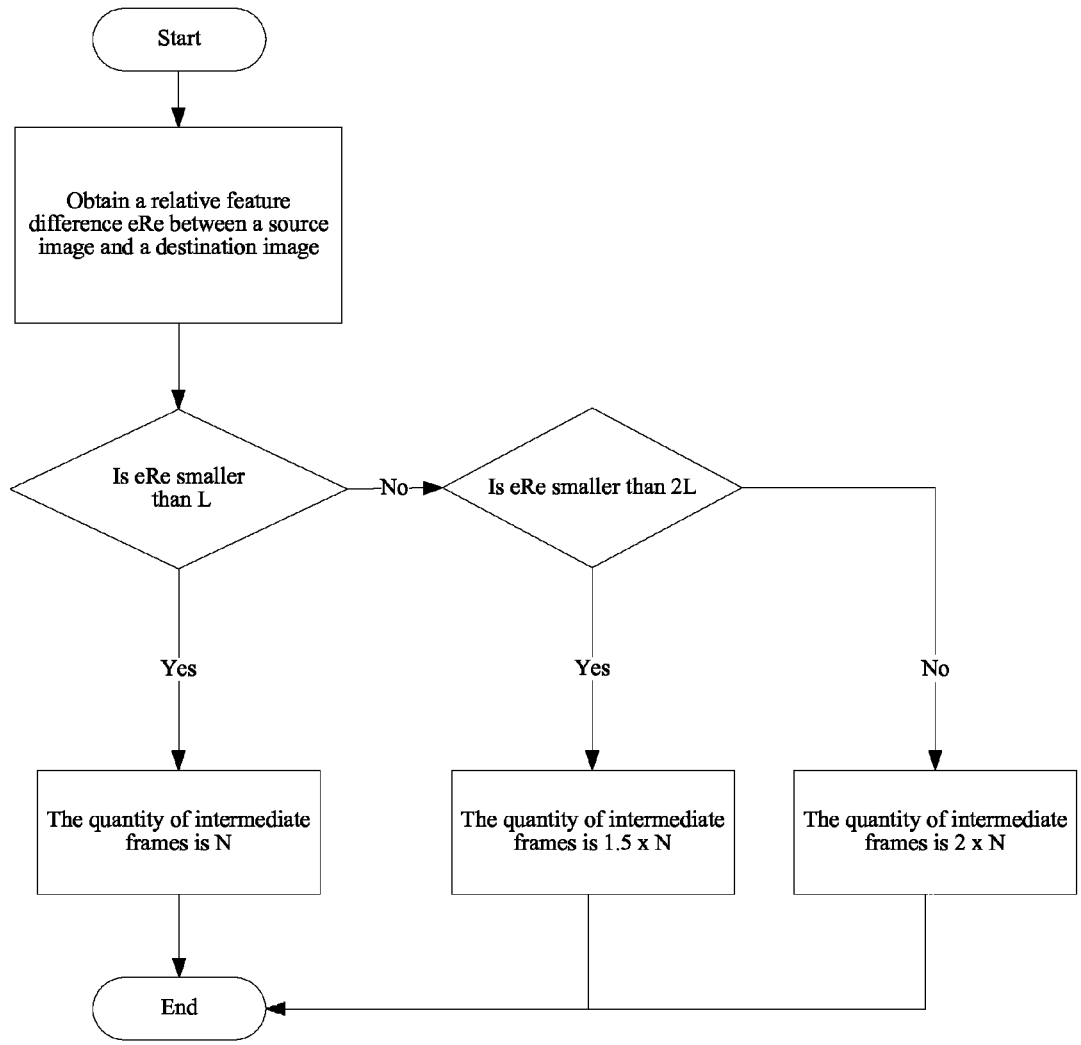
FIG. 5 is a flow chart of determining the quantity of intermediate frames according to an embodiment of the present invention.

Referring to FIG. 5, FIG. 5 is a flow chart of determining the quantity of intermediate frames according to an embodiment of the present invention, and a process includes:

when aRe is smaller than L, the quantity of intermediate frames to be inserted is N;

when aRe is greater than L and smaller than 2L, the quantity of intermediate frames to be inserted is 1.5*N; and when aRe is greater than 2L, the quantity of intermediate frames to be inserted is 2*N.

In this embodiment of the present invention, a value of a first interval is (0, L), a value of a second interval is (L, 2L), a preferred value of L in this embodiment of the present invention is 0.25, and persons skilled in the art may take another value according to an actrual demand; and a first value in this embodiment of the present invention is N, a second value in this embodiment of the present invention is 1.5*N, where N is a natural number, in an exemplary embodiment of the present invention, N may be a random number between 16 and 24, and persons skilled in the art may take another natural number according to an actrual demand.

After the quantity of intermediate frames is obtained, intermediate frame images are generated from the source image and the destination image. A process includes:

Perform feature point selection on the source image and the destination image, and generate source control points (Source Control Points, SCP) and destination control points (Destination Control Points, DCP) respectively.

Generate intermediate control points (Inter Control Points, ICP) through the SCPs and the DCPs, where an ICP at the time t is expressed as ICP(t), which is a linear transition process in this spesification, make t=0, and a formula for calculating ICP(t) is shown in (11):

$$ICP(t) = (1-t)*SCP(t) + t*DCP(t) t \in [0,1] \quad (11).$$

A SCP and the ICP(t) are used as a source control point and a destination control point respectively to perform image warping on the source image (Source Image, SI) to obtain a source warped image (Source Warped Image, SWI(t)); and a DCP and the ICP(t) are used as a source control point and a destination control point respectively to perform image warping on the destination image (Destination Image, DI) to obtain an image (Destination Warped Image, DWI(t)).

Image fusion is performed on SWI(t) and DWI(t) according to formula (12) to obtain an intermediate image (Inter Image, INTER_I(t)).

$$INTER\_I(t)=t*SWI(t)+(1-t)*DWI(t) \quad (12).$$

Finally, t is added by a warp step size $$\Delta t = \frac{1}{N},$$

N is the quantity of intermediate images, and the process repeats by adding Δt.

In conclusion, through every Δt, one intermediate transition image INTER_I(t) between the source image and the destination image is obtained and image morphing is completed through N Δt.

The morphing animation is a morphing animation with a fixed playback duration. Before image morphing preprocessing is performed on sorted adjacent images in S101, the method further includes judging whether current remaining time of the playback duration is greater than zero; and the performing hue preprocessing on adjacent images among the multiple images includes: if the current remaining time is greater than zero, performing hue preprocessing on the adjacent images among the multiple images.

Figure 6:
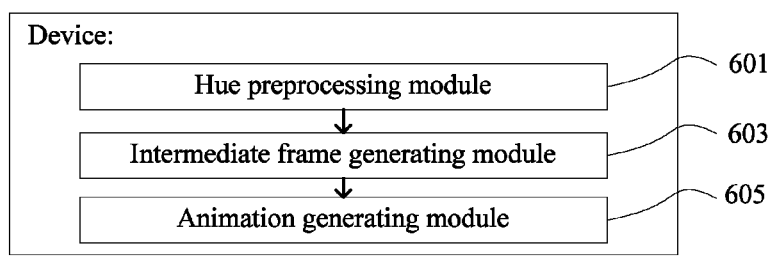
FIG. 6 is a schematic structural diagram of a device for generating a morphing animation from multiple human face images according to an embodiment of the present invention.

The present invention provides a device for generating a morphing animation from multiple images. Referring to FIG. 6, FIG. 6 is a schematic structural diagram of a device for generating a morphing animation from multiple images according to an embodiment of the present invention. The device includes: a hue preprocessing module 601, configured to perform hue preprocessing on adjacent images among the multiple images to reduce a hue difference between the adjacent images, so that a generated animation switches more smoothly from one to the other of the adjacent images; an intermediate frame generating module 603, configured to determine the quantity of intermediate frames according to a feature point differential of the adjacent images on which the hue preprocessing has been performed by the hue preprocessing module, generate, between the adjacent images through an image warping technology, intermediate frame images, the quantity of which is the same as that of the intermediate frames, generate, between the adjacent images through an image warping technology, intermediate frame images, the quantity of which is the same as that of the intermediate frames; and an animation generating module 605, configured to generate a morphing animation from the multiple images and the intermediate frame images that are inserted between all adjacent images among the multiple images.

In an embodiment of the present invention, the multiple images are multiple human face images; and the hue preprocessing module is configured to perform hue preprocessing on adjacent images among the multiple human face images to reduce a hue difference of the adjacent images.

In another embodiment of the present invention, a sorting module is further included, and is configured to sort the multiple human face images to generally reduce a difference between adjacent images, so that a generated animation is played more smoothly from one to the other of the adjacent images; and the hue preprocessing module is configured to perform hue preprocessing on adjacent images among the multiple images on which the processing has been performed by the sorting module.

The sorting module is configured to sort the multiple human face images according to human face sizes.

The sorting module is configured to sort the multiple human face images according to image intensity.

The hue preprocessing module 601 is configured to perform calculation according to hues of the adjacent images to obtain a hue difference of the adjacent images, obtain a hue difference absolute value through calculation according to the hue difference, and when the difference absolute value is greater than a first threshold, determine an image whose hue needs to be adjusted in the adjacent images and a hue adjustment manner according to the difference, and then perform, according to the hue adjustment manner, hue adjustment on the image whose hue needs to be adjusted.

The intermediate frame generating module 603 is configured to determine the quantity of intermediate frames according to similarity of the adjacent images, which includes: determining the quantity of intermediate frames according to a feature point differential of the adjacent images.

The intermediate frame generating module 603 is configured to determine the quantity of intermediate frames according to a feature point differential of the adjacent images, which specifically includes: when a value of the similarity of the adjacent images falls in a first interval, determining the quantity of intermediate frames as the first quantity; and when a value of the similarity of the adjacent images falls in a second interval, determining the quantity of intermediate frames as the second quantity, where a value of the first interval is smaller than a value of the second interval, and the first quantity is smaller than the second quantity.

The device further includes an intensity preprocessing module: configured to perform intensity preprocessing on adjacent images among the multiple human face images; and the intermediate frame generating module is configured to generate a morphing animation according to adjacent images on which hue preprocessing and intensity preprocessing have been performed.

The intensity preprocessing module is specifically configured to: perform calculation according to intensity of the adjacent images to obtain an intensity difference of the adjacent images, and obtain an intensity difference absolute value according to the intensity difference, and when the difference absolute value is greater than a second threshold, determine an image whose intensity needs to be adjusted in the adjacent images and an intensity adjustment manner according to the difference, and then perform, according to the intensity adjustment manner, intensity adjustment on the image that needs to be adjusted.

In an embodiment of the present invention, a morphing animation is an animation with a fixed playback duration, the device further includes: a judging module, configured to judge whether current remaining time of the playback duration is greater than zero; and the hue preprocessing module is configured to, when the current remaining time of the playback duration is greater than zero, perform hue preprocessing on adjacent images among the multiple images.

Figure 7:
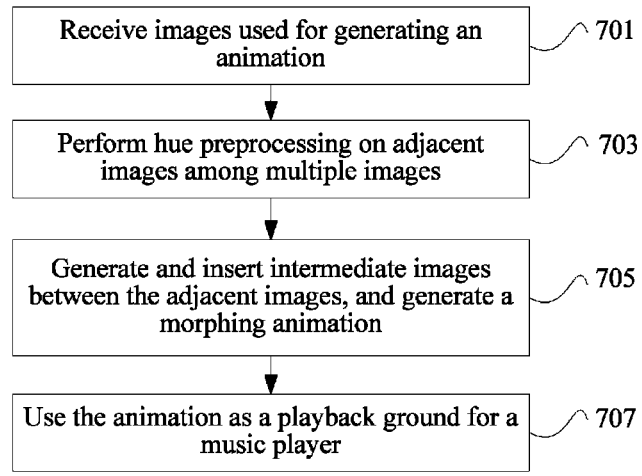
FIG. 7 is a flow chart of a method for generating a playback background for a music player according to an embodiment of the present invention.
Figure 8:
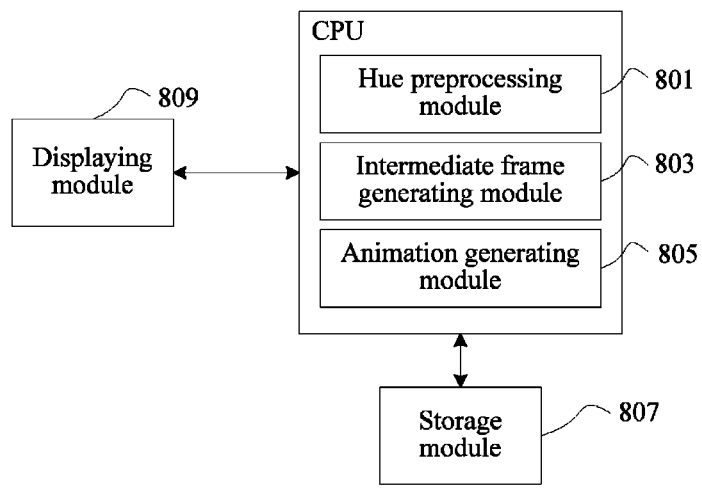
FIG. 8 is a schematic structural diagram of a music player according to an embodiment of the present invention.

An embodiment of the present invention provides a method for generating a playback background for a music player. Referring to FIG. 7, FIG. 7 is a structural diagram according to an embodiment of the present invention, which includes:

S701: Receive multiple images used for generating an animation.

S703: Perform hue preprocessing on adjacent images among the multiple images to reduce a hue difference between the adjacent images.

S705: Determine the quantity of intermediate frames according to a feature point differential of the adjacent images on which the hue preprocessing has been performed, generate, between the adjacent images through an image warping technology, intermediate frame images, the quantity of which is the same as that of the intermediate frames, and insert the intermediate frame images between the adjacent images, and generate a morphing animation from the multiple images and the intermediate frame images that are inserted between all adjacent images among the multiple images.

S707: Use the morphing animation generated from the multiple images as a playback background for the music player.

In an embodiment of the present invention, the multiple images are multiple human face images; and the performing hue preprocessing on adjacent images among the multiple images includes: performing hue preprocessing on adjacent images among the multiple human face images.

The hue preprocessing module is configured to perform hue preprocessing on adjacent images among the multiple human face images to reduce a hue difference of the adjacent images.

In this embodiment of the present invention, before the determining the quantity of intermediate frames according to the feature point differential of the adjacent images, the method includes: positioning a feature point of a human face image in the multiple images.

A method for positioning a feature point includes: positioning a feature point of a human face through automatic detection.

The positioning a feature point of a human face through automatic detection is: for a specified picture, on the basis of human face detection, a key feature point of a human face is detected automatically without many manual operations of a user, and human face positioning is convenient and fast. The positioning a feature point of a human face through automatic detection is: detecting and positioning a feature point of a human face through an active shape model algorithm.

The positioning a feature point of a human face image includes: positioning a feature point of a human face image through overall dragging or single-point dragging. An overall dragging method is to divide feature points of a human face image into five parts of feature points of a human face profile, eyebrow, eye, nose, and mouth; and the five parts of the feature points of the human face profile, eyebrow, eye, nose and mouth are respectively dragged as a whole. For two parts of eyebrows and eyes, the left and right eyebrows and the left and right eyes are also dragged separately. The overall dragging may avoid too troublesome movement of feature points one by one due to a great distance between the feature point positioned through automatic detection and an actual template of a feature point of a human face in a manual positioning mode.

With a single-point dragging method, a feature point is selected by dragging one by one to implement a precise positioning operation of a human face feature.

In this embodiment of the present invention, a positioning method for automatically detecting and positioning a feature point is mainly adopted. When the automatic detection and positioning method has an undesirable effect, a feature point of a human face image is positioned through overall dragging or single-point dragging, and an unsatisfied feature point that is automatically detected and positioned is adjusted.

Before image morphing preprocessing is performed on adjacent images among the images, the method further includes: obtaining current remaining time of a music file by capturing a timestamp of the music file. It is judged whether the current remaining time is greater than zero. The performing image hue preprocessing on the adjacent images among the images refers to, when the current remaining time is greater than zero, performing hue preprocessing on the adjacent images among the multiple images.

In this embodiment of the present invention, photos are dynamically loaded at the same time when music is played, and each time only two photos that require human face transformation need to be loaded in a memory and are deleted upon transformation. Two new photos are then loaded without memory consumption.

When a time interval of loading photos is too large, smoothness of the playback background is affected, and when a time interval of loading photos is too small, the playback background becomes overwhelming and confusing, so that an original picture of a real human face cannot be distinguished and each frame changes continuously. In this embodiment of the present invention, an optimal time interval is 3 to 5 seconds; however, the present invention is not limited to this value of the time interval.

An embodiment of the present invention provides a music player, where the music player includes: a hue preprocessing module 801, configured to perform hue preprocessing on adjacent images among multiple images to reduce a hue difference between the adjacent images; an intermediate frame generating module 803, configured to determine the quantity of intermediate frames according to a feature point differential of the adjacent images on which processing has been performed by the hue preprocessing module, where the feature point differential is obtained through calculation according to a pixel distance of feature points that correspond to the adjacent images, generate, between the adjacent images through an image warping technology, intermediate frame images, the quantity of which is the same as that of the intermediate frames, and insert the intermediate frame images between the adjacent images; an animation generating module 805, configured to generate a morphing animation according to the multiple images and the intermediate frame images that are inserted between all adjacent images among the multiple images; and a playback module, configured to play a music file, and when remaining playback time of the music file is greater than zero, play the morphing animation on a video display interface of the music file.

The music player provided in this embodiment of the present invention further includes: a storage module 807, configured to store the music file and the multiple images.

The music player provided in this embodiment of the present invention further includes: a displaying module 809, configured to display a video display interface of the music file.

It may be understood by persons skilled in the art that the accompanying drawings are merely schematic diagrams of an exemplary embodiment, and modules or procedures in the accompanying drawings are not necessarily required for implementing the present invention.

Persons skilled in the art may understand that modules in the devices provided in the embodiments may be arranged in the devices in a distributed manner according to the description of the embodiments, and may also be arranged in one or multiple devices that are different from those described in the embodiments. The modules in the embodiments may be combined into one module, and may also be split into multiple submodules.

Finally, it should be noted that the foregoing embodiments are only used for describing the technical solutions of the present invention, but are not intended to limit the present invention. Although the present invention is described in detail with reference to the foregoing embodiments, persons of ordinary skill in the art should understand that modifications may still be made to the technical solutions described in the foregoing embodiments, or equivalent replacements may be made to some technical features of the technical solutions, however, these modifications or replacements do not cause corresponding technical solutions to depart from the spirit and scope of the technical solutions in the embodiments of the present invention.

What is claimed is:

1. A method for generating a morphing animation, comprising:
performing hue preprocessing on adjacent images among multiple human face images to reduce a hue difference between the adjacent images;
determining the quantity of intermediate frames between the hue preprocessed adjacent images according to a feature point differential of the hue preprocessed adjacent images, wherein the feature point differential is obtained through calculation according to a pixel distance of feature points that correspond to the adjacent images;
generating the intermediate frame images through an image warping technology;
inserting the intermediate frame images between the adjacent images; and
generating a morphing animation from the multiple human face images and the intermediate frame images, wherein the hue preprocessing comprises:
subtracting a mean hue value of a first image in the adjacent images from a mean hue value of a second image in the adjacent images to obtain the hue difference between the first image and the second image;
obtaining a hue difference absolute value according to the hue difference,
when the hue difference absolute value is greater than a first threshold,
if the hue difference is greater than zero, decreasing a hue of each pixel in the first image or increasing a hue of each pixel in the second image, and
if the hue difference is smaller than zero, increasing a hue of each pixel in the first image or decreasing a hue of each pixel in the second image.

2. The method according to claim 1, further comprising:
sorting the multiple human face images before the hue preprocessing is performed.

3. The method according to claim 2, wherein the multiple human face images are sorted according to size of human face.

4. The method according to claim 2, wherein the multiple human face images are sorted according to image intensity.

5. The method according to claim 1, further comprising:
performing intensity preprocessing on adjacent images among the multiple human face images to reduce an intensity difference of the adjacent images.

6. The method according to claim 5, wherein the intensity preprocessing comprises:
performing calculation according to intensity of the adjacent images to obtain an intensity difference of the adjacent images;
obtaining an intensity difference absolute value according to the intensity difference; and
when the difference absolute value is greater than a second threshold, determining an image whose intensity needs to be adjusted in the adjacent images and an intensity adjustment manner according to the intensity difference, and
performing, according to the intensity adjustment manner, intensity adjustment on the image whose intensity needs to be adjusted.

7. The method according to claim 6, wherein the performing calculation according to the intensity of the adjacent images to obtain the intensity difference of the adjacent images comprises:
subtracting a mean intensity value of the first image from a mean intensity value of the second image in the adjacent images to obtain the intensity difference of the adjacent images; and
the performing, according to the intensity adjustment manner, intensity adjustment on the image that needs to be adjusted comprises:
if the intensity difference is greater than zero, decreasing intensity of each pixel in the first image or increasing intensity of each pixel in the second image, and
if the intensity difference is smaller than zero, increasing intensity of each pixel in the first image or decreasing intensity of each pixel in the second image.

8. The method according to claim 1, wherein the determining the quantity of intermediate frames comprises:
when a value of the feature point differential of falls in a first interval, determining the quantity of intermediate frames as a first quantity; and
when a value of the feature point differential falls in a second interval, determining the quantity of intermediate frames as a second quantity, wherein the value of the first interval is smaller than the value of the second interval, and the first quantity is smaller than the second quantity.

9. The method according to claim 1, wherein the morphing animation is a morphing animation with a fixed playback duration, and
the hue preprocessing is performed if the current remaining time of the playback duration is greater than zero.

10. A device for generating a morphing animation, comprising:
a hue preprocessing module, configured to perform hue preprocessing on adjacent images among multiple human face images to reduce a hue difference between the adjacent images;
an intermediate frame generating module, configured to:
determine the quantity of intermediate frames between the hue preprocessed adjacent images according to a feature point differential of the hue preprocessed adjacent images, wherein the feature point differential is obtained through calculation according to a pixel distance of feature points that correspond to the adjacent images;
generate, the intermediate frame images through an image warping technology; and
insert the intermediate frame images between the adjacent images; and
an animation generating module, configured to generate a morphing animation from the multiple human face images and the intermediate frame images, wherein the hue preprocessing comprises:
subtracting a mean hue value of a first image in the adjacent images from a mean hue value of a second image in the adjacent images to obtain the hue difference between the first image and the second image;
obtaining a hue difference absolute value according to the hue difference,
when the hue difference absolute value is greater than a first threshold, if the hue difference is greater than zero, decreasing a hue of each pixel in the first image or increasing a hue of each pixel in the second image, and if the hue difference is smaller than zero, increasing a hue of each pixel in the first image or decreasing a hue of each pixel in the second image.

11. The device according to claim 10, further comprising:
a sorting module, configured to sort the multiple human face images before the hue preprocessing is performed.

12. The device according to claim 11, the multiple human face images are sorted according to size of human face.

13. The device according to claim 11, wherein the multiple human face images are sorted according to image intensity.

14. The device according to claim 10,
further comprising an intensity preprocessing module, configured to perform intensity preprocessing on the adjacent images among the multiple human face images.

15. The device according to claim 14, wherein the intensity preprocessing comprises:
perform calculation according to intensity of the adjacent images to obtain an intensity difference of the adjacent images,
obtain an intensity difference absolute value according to the intensity difference, and
when the difference absolute value is greater than a second threshold, determine an image whose intensity needs to be adjusted in the adjacent images and an intensity adjustment manner according to the difference, and
perform, according to the intensity adjustment manner, intensity adjustment on the image whose intensity needs to be adjusted.

16. The device according to claim 10, wherein the quantity of the intermediate frame is determined according to one of the following manner:
when a value of similarity of the adjacent images falls in a first interval, determine the quantity of intermediate frames as a first quantity; and
when a value of similarity of the adjacent images falls in a second interval, determine the quantity of intermediate frames as a second quantity, wherein a value of the first interval is smaller than a value of the second interval, and the first quantity is smaller than the second quantity.

17. The device according to claim 10, wherein the morphing animation is an animation with a fixed playback duration, and
the hue preprocessing is performed when the current remaining time of the playback duration is greater than zero.

18. A method for generating a music playback background, comprising:
receiving multiple human face images used for generating an animation;
performing hue preprocessing on adjacent images among the multiple human face images to reduce a hue difference between the adjacent images;
determining the quantity of intermediate frames between the hue preprocessed adjacent images according to a feature point differential of the hue preprocessed adjacent images;
generating the intermediate frame images through an image warping technology;
inserting the intermediate frame images between the adjacent images; and
generating a morphing animation from the multiple human face images and the intermediate frame images; and
using the morphing animation as the music playback background, wherein the hue preprocessing comprises:

subtracting a mean hue value of a first image in the adjacent images from a mean hue value of a second image in the adjacent images to obtain the hue difference between the first image and the second image;
obtaining a hue difference absolute value according to the hue difference,
when the hue difference absolute value is greater than a first threshold,
if the hue difference is greater than zero, decreasing a hue of each pixel in the first image or increasing a hue of each pixel in the second image, and
if the hue difference is smaller than zero, increasing a hue of each pixel in the first image or decreasing a hue of each pixel in the second image.

19. The method according to claim 18, further comprising:
positioning feature points of each of the multiple human face images before the determining the quantity of intermediate frames.

20. The method according to claim 19, wherein the feature points are positioned through automatic detection.

21. The method according to claim 19, wherein the feature points are detected and positioned through an active shape model algorithm.

22. The method according to claim 19, wherein the feature points
are positioned through overall dragging or single-point dragging;
the overall dragging comprises:
dividing feature points into five parts including a human face profile, eyebrow, eye, nose, and mouth; and
dragging the five parts as a whole; and
the single-point dragging comprises dragging each feature point separately.

23. The method according to claim 18, further comprising:
obtaining current remaining time of a music file by capturing a timestamp of the music file, wherein the hue preprocessing is performed when the current remaining time is greater than zero.

24. A music player, comprising:
a hue preprocessing module, configured to perform hue preprocessing on adjacent images among multiple human face images to reduce a hue difference between the adjacent images;
an intermediate frame generating module, configured to:
determine the quantity of intermediate frames between the hue preprocessed adjacent images according to a feature point differential of the hue preprocessed adjacent images, wherein the feature point differential is obtained through calculation according to a pixel distance of feature points that correspond to the adjacent images;
generate, the intermediate frame images through an image warping technology; and
insert the intermediate frame images between the adjacent images;
an animation generating module, configured to generate a morphing animation according to the multiple human face images and the intermediate frame images; and
a playback module, configured to play a music file, and when remaining playback time of the music file is greater than zero, play the morphing animation on a video display.

25. The music player according to claim 24, wherein the multiple human face images are sorted bofore the hue preprocessing is performed.

26. The music player according to claim 25, wherein the multiple human face images are sorted accroding to size of human face.

27. The music player according to claim 25, wherein the multiple human face images are sorted accroding to image intensity.

28. The music player according to claim 24, wherein the morphing animation is a morphing animation with a fixed playback duration.

29. The music player according to claim 28, wherein the hue preprocessing is performed when the current remaining time of the playback duration is greater than zero.

30. The music player according to claim 24, further comprising an intensity preprocessing module, configured to perform intensity preprocessing on the adjacent images among the multiple human face images.

* * * * *